United States Patent [19]
Dietert

[11] 3,782,547
[45] Jan. 1, 1974

[54] STRUCTURE FOR ULTRASONIC SCREENING

[75] Inventor: Harry W. Dietert, Kerrville, Tex.

[73] Assignee: Harry W. Dietert Co., Detroit, Mich.

[22] Filed: Oct. 12, 1971

[21] Appl. No.: 188,251

[52] U.S. Cl............................ 209/268, 209/1, 210/19
[51] Int. Cl............................ B03b 3/00, B07b 1/00
[58] Field of Search...................... 209/269, 1, 268, 209/233; 210/19; 259/1 R

[56] References Cited
UNITED STATES PATENTS

| | | | |
|---|---|---|---|
| 2,468,550 | 4/1949 | Fruth | 210/19 X |
| 2,800,228 | 7/1957 | Horsley | 209/269 |
| 3,463,321 | 8/1969 | Van Ingen | 209/233 X |
| 3,490,584 | 1/1970 | Balamuth | 209/1 |
| 3,009,576 | 11/1961 | Jones | 209/268 |
| 3,064,806 | 11/1962 | Hukki | 209/268 X |
| 3,410,532 | 11/1968 | Bodine | 259/1 R X |
| 3,490,585 | 1/1970 | Gooding | 209/270 X |
| 3,720,306 | 3/1973 | Hedler | 209/1 |

FOREIGN PATENTS OR APPLICATIONS

| | | | |
|---|---|---|---|
| 886,884 | 10/1951 | Germany | 210/19 |
| 6,707,502 | 12/1968 | Netherlands | 210/19 |

*Primary Examiner*—Robert Halper
*Attorney*—Dale R. Small et al.

[57] ABSTRACT

Microparticle separation by ultrasonic screening in both batch and continuous operations and structure for accomplishing such operations. In the batch operation, particles to be cleaned and separated in accordance with their size are placed in a filter screen container, and the filter screen container is immersed in a water bath which is vibrated at an ultrasonic frequency so that the filter screen is maintained in a clean condition and the particles are scrubbed clean so as to pass readily through the filter screen under pressure. In the continuous microparticle separation operation, material is fed into a first chamber in which a vibrated water bath is maintained by water jets directed toward a vibrated filter screen separating a container into a first and second chamber. Filtered material and a portion of the water bath are withdrawn from the second chamber, and the rest of the water along with the residue of the material to be filtered are withdrawn from the first chamber. In both the batch and continuous methods, the water bath and/or filter medium are vibrated at between fifteen and sixty thousand hertz.

2 Claims, 3 Drawing Figures

PATENTED JAN 1 1974  3,782,547
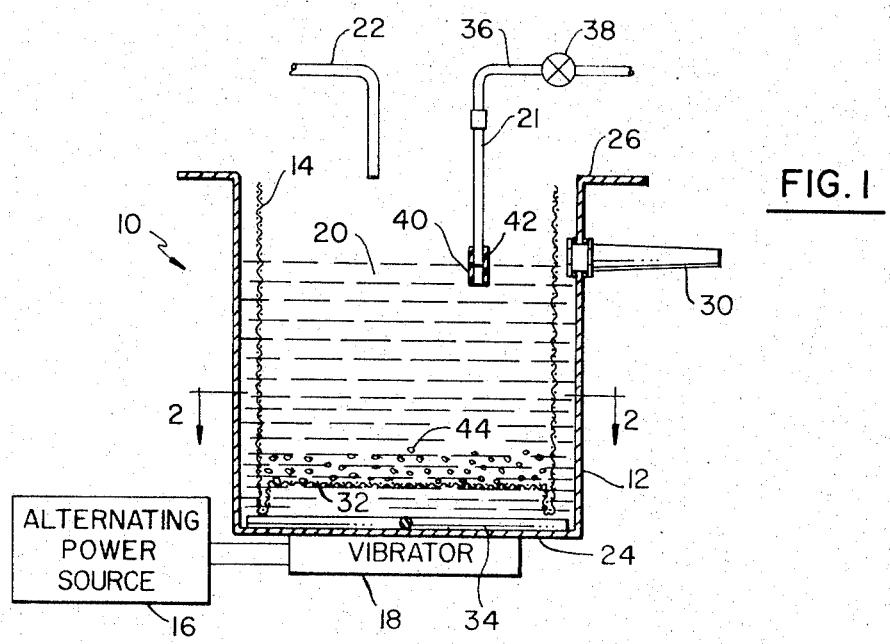
FIG. 1
FIG. 2
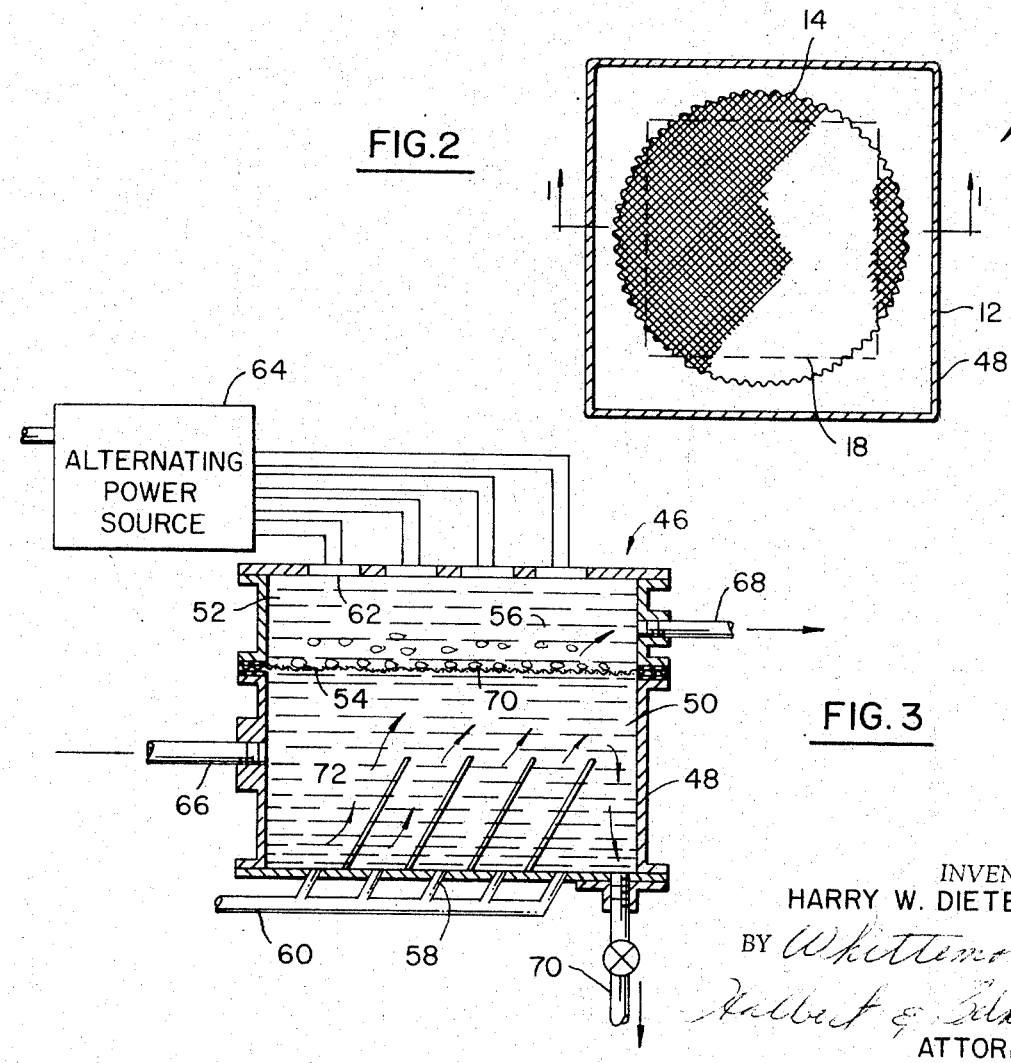
FIG. 3
INVENTOR.
HARRY W. DIETERT
BY Whittemore
Hulbert & Belknap
ATTORNEYS

STRUCTURE FOR ULTRASONIC SCREENING

BACKGROUND OF THE INVENTION

1. Field of the Invention

The invention relates to microparticle separation and refers more specifically to the filtering of particles of, for example, up to fifty microns in size through a filter screen with the particles in a liquid bath by vibrating the liquid bath and/or filter screen at an ultrasonic frequency to scrub the particles and maintain them and the filter screen clean and to therefore maintain the filter screen at maximum efficiency at all times.

2. Description of the Prior Art

Microparticle separation such as the separation of foundry sand grains and foundry sand additives has often been accomplished by the use of fine filter means. The particles to be separated by filter means often have coatings of air, clay or other material thereon which prevent their ready passage through a filter medium of for example a fifty micron screen.

In addition, the filter mediums of the past have become clogged with either coated particles or particles too large to pass therethrough at a relatively rapid rate whereby the filtering capabilities of the filters have been greatly diminished in a relatively short time, requiring stopping of the separation process and cleaning of the filters.

Cleaning by causing ultrasonic vibrations in a liquid bath has been known in the past, as for example in U. S. Pat. Nos. 3,305,581 and 3,463,321. However, such cleaning has not been in conjunction with filtering as disclosed herein.

SUMMARY OF THE INVENTION

A sample of particulate material as, for example, foundry sand may be separated in accordance with the particle size thereof in either a batch or a continuous operation in accordance with the present invention.

In the batch operation, the particles to be separated may be placed in a filter screen container and the filter screen container placed in a water bath in an outer container. The outer container includes a drain for the water bath adjacent the top thereof, while the water bath is placed within the filter screen container to maintain a pressure head between the water bath inside and outside of the filter screen container and the water bath and/or filter screen are vibrated at an ultrasonic frequency.

In the continuous operation, the particles to be separated are passed into a first chamber in a container into which a water bath is introduced in a manner to force the particles toward a filter screen separating the first chamber from a second chamber of the container, while the water bath and/or filter screen are again vibrated at an ultrasonic frequency. A portion of the water bath is withdrawn together with the filtered particles from the second chamber of the container, while the remainder of the water bath is withdrawn from the first chamber along with particles too large to pass through the filter screen.

In both the batch and continuous microparticle separation operations, the vibration is at ultrasonic frequencies of between fifteen and sixty thousand hertz, a pressure head is maintained across the filter medium by the introduction of the water into the water bath, and additives are added to the water bath as desired to wet and/or disperse the particles therein.

BRIEF DESCRIPTION OF THE DRAWINGS

FIG. 1 is a longitudinal section view of ultrasonic screening structure for batch-type microparticle separation constructed in accordance with the invention and taken substantially on the line 1—1 in FIG. 2.

FIG. 2 is a transverse section view of the ultrasonic screening structure illustrated in FIG. 1 taken substantially on the line 2—2 in FIG. 1.

FIG. 3 is a longitudinal section view of a modification of the ultrasonic screening structure illustrated in FIG. 1 for continuous microparticle separation.

DESCRIPTION OF THE PREFERRED EMBODIMENTS

The ultrasonic screening structure 10 for microparticle separation as shown in FIG. 1 includes an outer container 12, an inner filter container 14, a source of ultrasonic alternating electrical energy of between fifteen and sixty thousand hertz 16 and an electrical frequency to mechanical vibration transducer 18. The microparticle separation structure 10 further includes the means 21 for providing a water bath 20 in the containers 12 and 14 and means 22 for placing additives in the containers 12 and 14.

The container 12 is substantially square and has a closed bottom end 24 and an open top end 26. The bottom 24 is relatively thin and is highly polished so as to transmit ultrasonic vibrations from the transducer 18 to the water bath 20 in the containers 12 and 14. An overflow outlet or drain 30 is provided in the container 12 adjacent the open end 26 thereof.

The filter container 14 is constructed of a fine mesh screen such as twenty microns having suitable supporting structure. The filter container 14 is separated from the bottom 24 of the container 12 by suitable means such as the recessed bottom 32 of the filter container construction and/or the cross-shaped spacing member 34 on which the container 14 is positioned in the container 12.

The source of alternating electrical energy 16 and the electrical to ultrasonic vibration transducer 18 are known in the art and will not therefore be considered in detail herein. Such equipment is, for example, obtainable from the Branson Instruments Company, a subsidiary of Smith Kline & French Laboratories, Stamford, Connecticut.

The structure 21 for maintaining a fluid bath in the containers 12 and 14, as shown in FIG. 1, may be a water conduit 36 having a valve 38 therein for regulating the water supply to the containers. A rubber tube 40 or the like is placed over the end 42 of the conduit 36 to prevent injury to the fine mesh screen container 14 in use. The structure 22 for adding additives to the water bath 28 may be entirely similar to the structure 21.

In operation of the microparticle separation structure illustrated in FIGS. 1 and 2, a batch of material to be separated in accordance with the size of the particles therein is placed in the filter container 14 and the container 14 is positioned within the outer container 12, as shown in FIG. 1. A water bath is provided in the containers 12 and 14 through the conduit 36 and the water bath 28 is vibrated at an ultrasonic frequency by the transducer 18 in response to the ultrasonic signal from the source of ultrasonic alternating electrical energy 16.

Both the particles 44 to be separated in the water bath 28 and the filter container 14 are thus vibrated at an ultrasonic frequency whereby the particles scrub each other and the filter so that the particles are freed from air bubbles and extraneous material such as clay or other fine material which may coat them and air bubbles and lodged particles too large to pass through the filter are removed from the filter 14.

A pressure head may be maintained between the inside and outside of the filter container 14 by regulating the valve 38 in conjunction with the opening of the overflow 30 from the outer container 12. Thus, the particles are urged to pass through the filter screen 32.

In addition, due to the additives passed through the additive adding means 22 into the water bath 28 such as, for example, sodium pyrophosphate and sodium hydroxide, the particles may be wetted and/or dispersed in the water bath 28 which also aids their filtering through the filter 14.

After a predetermined time of filtering the particles 44 as indicated above, the filter container 14 is removed from the outer container 12 and the filter container is weighed. The difference in weight between the initial weight of the filter container having the particles to be separated therein and the weight after filtering will provide an accurate indication of the quantity of material filtered through the filter container 14, if such measurement is desirable.

Alternatively or in addition, the overflow fluid from the overflow nozzle 30 may be dried and weighed to determine the amount of particulate material passing through the filter screen 14. Thus, an accurate indication of the quantity of a material having less than a predetermined size may be determined by means of the structure illustrated in FIG. 1 and the batch method described.

Should the continuous separation of fine material from coating and larger material be desired, the structure 46 illustrated best in FIG. 3 is provided. The structure illustrated in FIG. 3 includes a container 48 having a first chamber 50 and a second chamber 52 therein with a filter member 54 such as a twenty micron filter screen separating the chambers 50 and 52.

The water bath 56 in the container 53 which is maintained by jets 58 opening into chamber 50 from supply conduit 60 along with the filter screen 54 is again vibrated at ultrasonic frequencies of between fifteen and sixty thousand hertz by the transducers 62 excited by an alternating electric signal from the source 64. Particulate material which may be carried by the water bath is introduced into chamber 50 through conduit 66. Filtered particles and a portion of the water bath are withdrawn from the chamber 52 through conduit 68, while the remainder of the water bath is withdrawn through the conduit 70 from the chamber 50.

In operation of the continuous ultrasonic screening structure 14 for microparticle separation in a water bath, the water bath in the chambers 50 and 52 is vibrated at the ultrasonic frequency by the transducers 62. Again, the particles 70 are caused to scrub each other and pass through the filter screen 54 which is maintained in a clean condition due to the vibration thereof with the water bath and a hydrostatic head is provided between the chambers 50 and 52 due to regulation of the inlet pressure in the conduits 60 and 66 and the outlet pressures in the conduits 68 and 70.

The particles as they pass into the chamber 50 through the conduit 66 are urged toward the filter screen 54 by means of the water jets 58 and the baffles 72 directing the water jets and thus the particles toward the screen 54. The particles which pass the screen 54 and into chamber 56 are removed through conduit 68. Those that do not pass through screen 54 pass out of chamber 50 through conduit 70.

Again, if it is desired to provide an absolute indication of the quantity of particles passing the screen 54 or the material not passing the screen 54, or the relative percentage thereof, the material may be separated from the water bath withdrawn from the conduits 68 and 70, dried and weighed to provide a basis for any mathematical calculation.

While one embodiment of the invention has been considered in detail together with a modification thereof, it will be understood that other embodiments and modifications are contemplated. Thus, the inventor does not wish to be limited to the separation of foundry sand particles or to the use of the structure and method for microparticle separation by ultrasonic screening in foundry applications. It is therefore the intention to include all methods and structures as suggest themselves from the above disclosure within the scope of the appended claims.

What I claim as my invention is:

1. Structure for microparticle separation by ultrasonic screening under a pressure head in a batch operation comprising a first and a second water bath chamber defined by an outer container and a microparticle screen inner container positioned within the outer container having a bottom which is spaced from the bottom of the outer container with the inner container positioned within the outer container, a cross shaped member positioned on the bottom of the outer container on which the inner container is positioned to facilitate circulation of the water bath through the bottom of the inner container, means for producing a water bath flowing from the first of the chambers into the second chamber through the screen and out of the second chamber continuously, means for maintaining a pressure head in the first chamber during microparticle separation and means for vibrating the water bath at an ultrasonic frequency including a source of alternating electrical power, a vibrator connected to the source of electrical power for actuation thereby and connected to the bottom of the outer container to produce ultrasonic vibration thereof on actuation whereby a portion of the microparticles to be separated placed in the water bath in the one chamber all of which are of a size to pass through the screen are moved with the flow of the water bath through the screen and into the second chamber, and means for discharging the water bath and portion of the microparticles from the structure for microparticle separation including an overflow nozzle positioned adjacent the top of the outer container.

2. Structure for microparticle separation by ultrasonic screening under a pressure head in a continuous operation comprising a first water bath chamber for continually receiving microparticles placed therein and a second water bath chamber which chambers are formed by a container separated by a screen, means for producing a water bath flowing from the first of the chambers into the second chamber through the screen and out of the second chamber continuously, means for maintaining a pressure head in the first chamber during microparticle separation comprising water jets extending into the bottom of the first chamber, deflection means in the first chamber for deflecting the microparticles placed therein toward the screen in conjunction with the water jets, means for vibrating the water bath at an ultrasonic frequency comprising a source of alternating electrical power, vibrators positioned in the surface of the container parallel to the screen in contact with the water bath connected to the power source for providing vibrations at ultrasonic frequency on actuation whereby a portion of the microparticles to be separated placed in the water bath all of a size to pass through the screen are moved with the flow of the water bath through the screen and into the second chamber, and means for discharging the water bath and portion of the microparticles from the structure for microparticle separation including a drain for withdrawing part of the water bath from the first chamber and a drain for withdrawing the remainder of the water bath and the portion of the microparticles from the second chamber.

* * * * *